United States Patent [19]

Lappalainen et al.

[11] Patent Number: 5,632,916
[45] Date of Patent: May 27, 1997

[54] LASER MARKING METHOD AND A METAL SURFACE MARKED BY THIS METHOD

[75] Inventors: Reijo Lappalainen, Helsinki; Sten Siren, Parainen; Teijo Salmi, Järvenpää; Pertti Helle, Parainen, all of Finland

[73] Assignee: Partek Cargotec Oy, Finland

[21] Appl. No.: 428,145

[22] PCT Filed: Oct. 22, 1993

[86] PCT No.: PCT/FI93/00433

§ 371 Date: May 1, 1995

§ 102(e) Date: May 1, 1995

[87] PCT Pub. No.: WO94/11146

PCT Pub. Date: May 26, 1994

[30] Foreign Application Priority Data

Nov. 9, 1992 [FI] Finland ................................ 925076

[51] Int. Cl.⁶ .................................................. B23K 26/00
[52] U.S. Cl. .................................................. 219/121.85
[58] Field of Search ........................ 219/121.68, 121.69, 219/121.85; 427/554, 555; 148/565; 346/107.1; 347/232

[56] References Cited

U.S. PATENT DOCUMENTS

| | | |
|---|---|---|
| 4,522,656 | 6/1985 | Kuhn-Kuhnenfeld . |
| 4,547,649 | 10/1985 | Butt et al. ............... 219/121.66 |
| 4,707,722 | 11/1987 | Folk et al. . |
| 4,806,730 | 2/1989 | Alexson ................. 219/121.69 |
| 4,847,181 | 7/1989 | Shimokawa ............ 219/121.69 |
| 4,922,077 | 5/1990 | Gordon .................. 219/121.68 |
| 4,972,061 | 11/1990 | Daley et al. ............ 219/121.69 |
| 5,406,042 | 4/1995 | Engelfriet et al. ..... 219/121.68 |

FOREIGN PATENT DOCUMENTS

| | | |
|---|---|---|
| 085484A1 | 8/1983 | European Pat. Off. . |
| 459461 | 12/1991 | European Pat. Off. ........ 427/555 |
| 60-137592 | 7/1985 | Japan ..................... 219/121.69 |
| 60-261573 | 12/1985 | Japan ..................... 427/555 |
| 2258183 | 10/1990 | Japan ..................... 219/121.69 |
| WO88/10475 | 12/1988 | WIPO . |
| WO89/07302 | 8/1989 | WIPO . |
| WO94/11146 | 5/1994 | WIPO . |

*Primary Examiner*—Geoffrey S. Evans
*Attorney, Agent, or Firm*—Scully, Scott, Murphy & Presser

[57] ABSTRACT

A method of providing by a laser beam on a bright metal surface (1) areas discernible from the surrounding surface as darker areas for producing for instance optically readable marks (5) and a metal surface provided in this manner. The procedure for producing marks not weakening the general properties of the metal surface is that the metal surface (1) is exposed to a laser beam pulse, the energy of which is 1 to 10 J/cm², preferably 3 to 5 J/cm² and the duration 5 ns to 1 μs, preferably 15 to 30 ns; a spot of impact (7) of the laser beam pulse on the metal surface (1) is changed in such a way that a new spot of impact (8) overlaps the earlier spot of impact (7) and the metal surface (1) is exposed to a new laser beam pulse, such that an area (7a) of the metal surface, where the pulses do not overlap each other and which abuts on the spot of impact of the new pulse, gets a color contrasting with the original metal surface (1).

10 Claims, 1 Drawing Sheet

LASER MARKING METHOD AND A METAL SURFACE MARKED BY THIS METHOD

BACKGROUND OF THE INVENTION

The object of the invention is a method of providing by means of a laser beam on a bright metal surface areas discernible from the surrounding surface as darker areas, for producing for instance optically readable marks and a metal surface comprising areas coloured in this way, the surface being substantially smooth within the coloured areas and the coloured areas being mainly at the same level as the metal surface surrounding these areas.

Lasers are commonly used in the packaging industry for marking dates, symbols and bar codes on packages. Further, lasers are used for marking various machine parts. The used marking methods may be roughly divided into two groups depending on whether the mark is produced a) by engraving on surface (melting, vaporization)

b) by providing a chemical reaction/a change in microstructure by means of a laser beam (heating).

Generally, Nd-YAG and $CO_2$ lasers are used for marking, the effect of laser pulses being based on the heat effect of the beam (wavelengths of the pulses are within the infrared area).

A pattern to be marked is formed either by a mask, through which a laser beam passes, or by moving a focused laser beam/body to produce the desired pattern.

Engraving on surface (e.g. metals, plastics) means that the surface layer of a body is melted or material is vaporized from that layer. A mark discernible from the surface is thus produced. Such methods appear for instance from published applications EP 0 134 469 and WO 88/10475. The contrast created may be improved by various methods, as described for instance in published application WO 89/07302.

One alternative to surface engraving is to coat the surface to be marked with a material creating a good contrast with the basic material. By removing the coating by a laser, a mark having a good contrast is produced. A procedure like this is disclosed in U.S. Pat. No. 4,707,722, for instance. The same method is used e.g. for marking soft drink bottles, in which method the printing ink of a label is removed by a laser from the surface of a backing paper. A light backing paper and the printing ink create a good contrast, due to which the mark is easily readable.

Marks produced by the above marking methods are characterized in that they break the original surface and are situated at a level lower than the original surface.

A chemical reaction may also be utilized for marking. There are various organic coating agents (lacquer), which turn dark under the influence of a laser beam (under the influence of heat or UV radiation introduced) within an exposed area. In the same way, the metal may at first be anodized (an oxide layer on titanium, for instance) and then the oxide produced may be reduced by means of a laser, whereby a discernible contrast is created between the oxide and the reduced area. In this manner, a readable trace can be produced. Such a procedure appears e.g. from U.S. Pat. No. 4,547,649.

SUMMARY OF THE INVENTION

The object of the present invention is to provide a method of producing optically readable marks on a metal surface in such a way that the metal surface is substantially even and has a very good abrasion and corrosion resistance in spite of the marking. This is achieved by means of the method according to the invention, which is characterized in that the metal surface is exposed to a laser beam pulse, the energy of which is 1 to 10 $J/cm^2$, preferably 3 to 5 $J/cm^2$ and the duration 5 ns to 1 µs, preferably 15 to 30 ns;

a spot of impact of the laser beam pulse on the metal surface is changed in such a way that a new spot of impact overlaps the earlier spot of impact and the metal surface is exposed to a new laser beam pulse, whereby an area of the metal surface, where the pulses do not overlap each other and which abuts on the spot of impact of the new pulse, gets a colour contrasting with the original metal surface.

In the case of a chromium plated metal surface or a special steel surface having high chromium content, the marks get a rather dark colour.

To provide a preferably uniform coloured area, the propagation of the edge of successive pulses is 0,1 mm or less. Then the darkness of the coloured areas will be such that a sufficient contrast with respect to the surrounding surface is achieved for an optical reading. It is significant that no pretreatment of the metal surface to be marked, such as polishing, coating with some special layer or chemical treatment, is required for applying the method of the invention.

In practice, the above-mentioned energy levels and durations of the pulses may be provided perhaps most readily by means of an excimer-type laser, which is characterized in very short pulse lengths of a few tens of nanoseconds and a short wavelength of 198 to 308 nm (ultraviolet light). A short pulse duration limits the effect to a very thin surface layer and a short wavelength interacts with the material in a different manner than infrared radiation having longer waves. The short-waved ultraviolet light of the excimer laser is so energetic that it may e.g. break linkages of organic matters C-C, H-O, etc., without any heat effect. The whole operating range of the excimer laser, i.e. the repetition frequency range of the pulses, which is about 1 to 400 Hz in the present commercially available devices, has been found to be suitable for an implementation of the method according to the invention. Thus the operating range is mainly of significance only for the speed at which the marking can be carried out in practice.

On the other hand, the metal surface of the invention, comprising coloured areas and being substantially smooth within these coloured areas and the coloured areas being mainly at the same level as the metal surface surrounding these areas, is characterized in that the marks are produced by mutually non-overlapping areas of mutually overlapping spots of impact of laser beam pulses directed to the metal surface.

It is preferable in practice that the thickness of the coloured surface layer of a coloured area is less than 1 µm. In this way, the marks do not endanger the uniformity of the remaining surface layer in any way, not even in case if this surface layer consists of a coating on the surface of the metal. This is the case for instance in connection with chromium plated metal surfaces, because the thickness of the chromium layer often is at least about 20 µm.

BRIEF DESCRIPTION OF THE DRAWING

In the following, the method of the invention and the metal surface provided by this method will be described in more detail with reference to the attached drawing, in which.

DETAILED DESCRIPTION OF THE PREFERRED EMBODIMENTS

Figure 1:
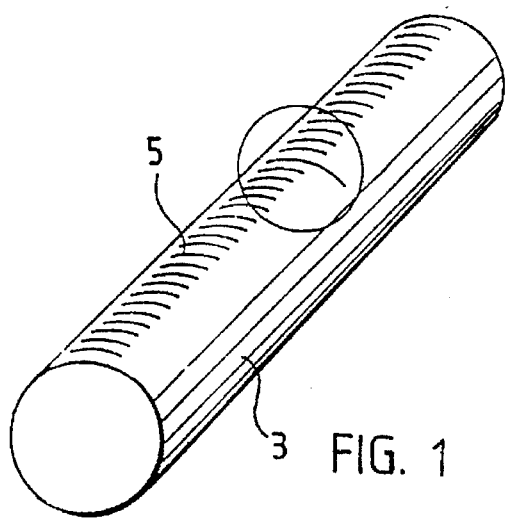
FIG. 1 shows a metal bar marked by the method according to the invention.
Figure 2:
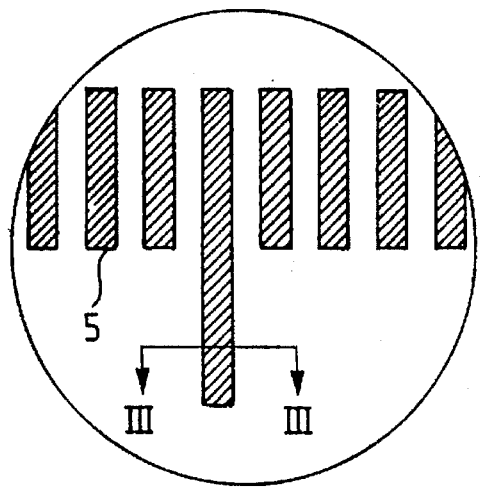
FIG. 2 shows marks produced on the metal bar of FIG. 1 in more detail.
Figure 3:
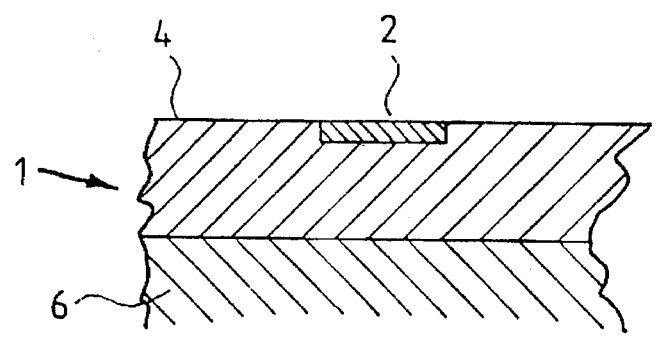
FIG. 3 shows a cross-section of a surface area of the metal bar of FIG. 1, which area is indicated in FIG. 2 as section III—III

FIG. 1 shows marks 5 produced by the method of the invention on the surface of a metal bar 3. In the case shown in the figure, these marks 5 are straight lines. FIG. 2 shows in greater detail these marks 5, which have been produced by the method of the invention and which are clearly discernible from the remaining metal bar 3 surface on the basis of the optical properties thereof, such as colour or darkness. FIG. 3 shows a cross-section of one mark shown in FIG. 2 illustrating a surface layer 1 of the metal bar 3, the surface 4 of the layer 1 and an area 2 marked on the layer. In the example shown in the figures, the surface layer 1 consists of a chrome plating on the surface of a steel bar 6. The thickness of this chrome plating is about 30 μm. By means of the method of the invention, the surface 4 of this metal surface 1 has been provided with the marked area 2, the thickness of which is less than 1 μm. The surface of this area 2 is substantially smooth and at the same level as the remaining surface 4 of the metal surface 1. This is natural, because in the method of the invention, material is not vaporized from this surface 4, at least not essentially. It is possible though that the laser beam pulse removes a very thin oxide layer from the metal surface.

Figure 4:
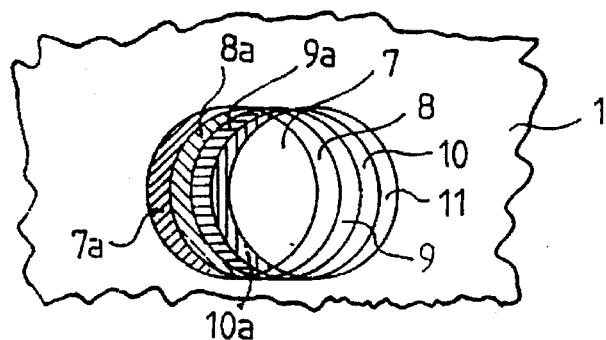
FIG. 4 shows how laser beam pulses producing the marks are mutually positioned on the metal surface.

FIG. 4 illustrates how marks are made on the metal surface 1 by means of laser beam pulses. In the example of FIG. 4, the spot of impact of a first pulse is indicated by reference numeral 7 and the spots of impact of the following pulses by reference numerals 8, 9, 10 and 11, respectively. In the example of the figure, the spots of impact of the pulses have been drawn round, but in practice they may be of another shape, too, such as rectangular or triangular. Before each following pulse, the laser beam or the metal surface or both have been moved in such a way that the spot of impact of a new pulse has been caused to move slightly sidewards from the previous spot of impact, but yet in such a manner that the spots of impact overlap each other strongly. The propagation of the edge of the successive pulses, i.e. the distance by which the spot of impact of the following pulse has been moved with respect to the spot of impact of the previous pulse, is allowed to be 0,04 mm at the most, in order that a uniform coloured area may be provided and this area may not consist of coloured strips separated by substantially uncoloured areas. Of course, this manner of colouring may give a sufficient contrast in some embodiments. That area of the spot of impact of a previous pulse where the spots of impact of a new pulse and the previous pulse are not on each other, i.e. they do not overlap each other, will constitute a surface the colour of which differs from the original colour of the surface. These areas are indicated in FIG. 4 by reference numerals 7a, 8a, 9a and 10a. In the case of chromium plated metal surface, these coloured areas are rather dark. When the propagation of the edge of the successive pulses is used, which propagation is 0,1 mm at the most, a good contrast of the marks is created within the area of visible light as well as infrared and possibly also ultraviolet light without the process slowing down unnecessarily, however. As a usable laser source in the method of the invention may be applied an excimer laser, which provides a pulse with a suitable energy in the simplest manner. A usable energy for the pulse is 1 to 10 J/cm², preferably 3 to 5 J/cm², and duration 5 ns to 1 μs, preferably 15 to 30 ns. The propagation of the edge of the successive pulses is allowed to be 0,1 mm at the most, in order that a uniform coloured area may be provided. It is essential to discover that, in practice, no trace whatsoever can be made on a metal surface by means of one single pulse. The desired colouring effect is achieved only by mutual overlap of pulses in the manner described above. In the following, the method of the invention is illustrated by means of two further examples.

EXAMPLE 1

The effect of different marking parameters on the darkness (contrast) of a line produced and on the surface roughness was studied in a test.

The wavelength of a used laser beam was 248 nm ultraviolet). The beam was directed by lenses to the surface of a body in such a way that the energy density of a pulse on the surface of the body was 3,4 J/cm² or 4,2 J/cm². In both cases, the repetition frequency of the laser pulses was 200 Hz. The metal surface was moved with respect to the beam in such a way that the provided propagation of the metal surface between successive pulses was 0,020 mm and 0,012 mm.

The width of the beam on the metal surface was 1 mm and the height in the motion direction varied between 0,2 and 2 mm.

The metal of the surface was hard chrome, which was wiped with a dry paper towel before marking. The hard chrome surface was ground after the chroming in such a way that the value of surface roughness Ra was 0,2 μm or better.

The results of the test are given in Table I.

TABLE I

| Beam height | Energy density | Pulse propagation | Line darkness | Surface roughness, Ra | |
|---|---|---|---|---|---|
| mm | J/cm² | mm | 0 to 5 | Before μm | After μm |
| 2 | 3,4 | 0,020 | 3 | 0,11 | 0,08 |
| 1,2 | 3,4 | 0,020 | 2 | 0,09 | 0,09 |
| 0,6 | 3,4 | 0,020 | 2 | 0,11 | 0,1 |
| 0,2 | 3,4 | 0,020 | 1 | 0,12 | 0,1 |
| 2 | 3,4 | 0,012 | 5 | 0,11 | 0,08 |
| 1,2 | 3,4 | 0,012 | 4 | 0,08 | 0,08 |
| 0,6 | 3,4 | 0,012 | 4 | 0,16 | 0,14 |
| 0,2 | 3,4 | 0,012 | 2 | 0,10 | 0,1 |
| 2 | 4,2 | 0,020 | 3 | 0,09 | 0,06 |
| 1,2 | 4,2 | 0,020 | 2 | 0,09 | 0,08 |
| 0,6 | 4,2 | 0,020 | 2 | 0,09 | 0,08 |
| 0,2 | 4,2 | 0,020 | 1 | 0,10 | 0,09 |
| 2 | 4,2 | 0,012 | 5 | 0,10 | 0,07 |
| 1,2 | 4,2 | 0,012 | 4 | 0,09 | 0,09 |
| 0,6 | 4,2 | 0,012 | 4 | 0,08 | 0,09 |
| 0,2 | 4,2 | 0,012 | 3 | 0,10 | 0,11 |

Line darkness 0 = hard chromed surface
5 = very dark

It is seen that a decrease in the beam height decreases the darkness of the line. On the basis of continued tests, the propagation of the edge of successive laser pulses is allowed to be 0,1 mm at the most to provide a sufficient darkness, and additionally, the beam height in the motion direction has to be sufficient in relation to the used propagation/pulse.

The number of pulses impacting the same area of the metal surface, i.e. the ratio between the height and propagation of the pulses, affects the contrast between the marks produced and the areas surrounding them. The higher the number of pulses is, the darker is the line produced.

Increasing energy density has not had any significant influence on the darkness obtained. On the other hand, the tests have shown that a sufficient darkness is not achieved at low energy densities (less than 3 J/cm$^2$) and that a too high energy density (more than 5 J/cm$^2$) again engraves a groove on the hard chrome surface. The optimum combination of darkness and even surface is achieved at energy densities in between.

The surface roughness values measured show that the used marking method does not impair the surface roughness of the hard chrome surface. The surface roughness is approximately the same measured before marking and after marking at a dark line.

EXAMPLE 2

The effect of different atmospheres on the contrast of a line to be obtained by marking was studied in the test.

The metal of the surface was ground hard chrome, the surface of which was wiped clean before marking with a piece of cloth dipped in spirit.

The wavelength of the used laser beam was 248 nm and the repetition frequency of the pulses 50 Hz. The metal surface was moved with respect to the beam in such a way that the propagation became 0.01 mm per pulse. The size of the beam on the hard chrome surface was 0,45×1,35 mm and the energy density 3,1 J/cm$^2$.

By means of the above marking parameters, the contrasts according to Table II were obtained for the dark lines produced. During the test, the gas pressure was 1 bar.

TABLE II

| Line contrast in different atmospheres. | |
| --- | --- |
| Atmosphere | Contrast |
| air | 0,8 |
| CO$_2$ | 0,8 |
| N$_2$ | 0,8 |
| O$_2$ | 0,8 |

From the results of Table II is seen that the atmosphere has no significant influence on the contrast of the line to be produced. In the other tests performed was discovered that a thin layer of dirt (soot, oil, water, wax) may exist on the surface of the bar without causing any inconvenience for the marking procedure or without affecting the contrast or surface quality of the darker area to be produced.

The method of the invention has above been illustrated by means of only one exemplifying embodiment and some examples and it is understandable that the metal surface comprising coloured areas provided by the method of the invention may be utilized for very many purposes of different kinds and likewise that the desired colouring effect may be caused also by other values than those mentioned in the examples, without differing from the scope of protection defined by the attached claims, however.

We claim:

1. A method for producing marks on a metal surface, comprising:

exposing the metal surface to a series of successive pulses of a pulsed laser beam, the laser beam having an energy between 1 and 10 J/cm$^2$, and each of the pulses forming a spot of impact on the metal surface; and moving the spots of impact on the metal surface, including the steps of
 (i) partially overlapping the spots of impact formed by each pair of immediately successive pulses, and
 (ii) for each pair of first and second spots of impact formed by immediately successive pulses, leaving a portion of the first spot of impact uncovered by the second spot of impact, wherein said uncovered portion becomes a color contrasting with the metal surface, and the spots of impact formed by said series of pulses form a mark on the metal surface.

2. A method according to claim 1, wherein the energy of the laser beam is between 3 and 5 J/cm$^2$.

3. A method according to claim 1, wherein the exposing step includes the step of exposing the metal surface to each of said series of pulses for a period between 15 and 30 nanoseconds.

4. A method according to claim 1, wherein the moving step includes the steps of:

moving the spots of impact forward on the metal surface along a path; and offsetting forward edges of immediately successive formed spots of impact by not more than 0.1 mm.

5. A method according to claim 1, further including the step of forming the mark with a thickness less than one micrometer.

6. An apparatus comprising a body having a substantially smooth metal surface;

said surface including a plurality of first areas and an area surrounding said first areas;

wherein each of said first areas has a color and is mainly at the same level as said surrounding area; and wherein each of said first areas is formed by non-overlapping portions of mutually, partially overlapping spots of impact of pulses of a pulsed laser beam directed onto the metal surface, said laser beam having an energy between 1 and 10 J/cm$^2$.

7. An apparatus according to claim 6, wherein the energy of the laser beam is between 3 and 5 J/cm$^2$.

8. An apparatus according to claim 6, wherein the metal surface is exposed to each of a series of said pulses for a period between 15 and 30 nanoseconds.

9. An apparatus according to claim 6, wherein:

each of the spots of impact has a leading edge in a forward direction; and the distance between the leading edges of immediately succeeding spots of impact is not greater than 0.1 mm.

10. An apparatus according to claim 6, wherein each of said first areas has a thickness less than one micrometer.

* * * * *